(12) United States Patent
Nitschmann (10) Patent No.: US 11,401,961 B2
(45) Date of Patent: Aug. 2, 2022

(54) DOUBLE CONNECTOR FOR BUTT-CONNECTING TWO COMPONENTS

(71) Applicant: Häfele GmbH & Co KG, Nagold (DE)

(72) Inventor: Gunter Nitschmann, Pfalzgrafenweiler (DE)

(73) Assignee: Häfele GmbH & Co KG, Nagold (DE)

( * ) Notice: Subject to any disclaimer, the term of this patent is extended or adjusted under 35 U.S.C. 154(b) by 985 days.

(21) Appl. No.: 16/138,976

(22) Filed: Sep. 22, 2018

(65) Prior Publication Data

US 2019/0024687 A1 Jan. 24, 2019

Related U.S. Application Data

(63) Continuation of application No. PCT/EP2017/052088, filed on Feb. 1, 2017.

(30) Foreign Application Priority Data

Apr. 25, 2016 (DE) ...................... 20 2016 102 175.8

(51) Int. Cl.
*F16B 5/00* (2006.01)
*F16B 13/08* (2006.01)
*F16B 12/24* (2006.01)

(52) U.S. Cl.
CPC ............ *F16B 5/0024* (2013.01); *F16B 12/24* (2013.01); *F16B 13/0858* (2013.01); *A47B 2230/0033* (2013.01); *F16B 13/0833* (2013.01)

(58) Field of Classification Search
CPC ........ F16B 5/0024; F16B 12/24; F16B 12/36; F16B 13/06; F16B 13/063; F16B 2012/103; F16B 2200/406; F16B 2/04; Y10T 403/55; Y10T 403/557; A47B 2095/006; A47B 2230/0029; A47B 2230/0033; A47B 2230/0037; A47B 2230/0051
USPC .................................. 403/DIG. 12, DIG. 13
See application file for complete search history.

(56) References Cited

U.S. PATENT DOCUMENTS

| | | | |
|---|---|---|---|
| 637,141 A | 11/1899 | Marx | |
| 3,954,345 A | 5/1976 | Morris | |
| 4,158,335 A * | 6/1979 | Belcastro | A47B 87/002 108/64 |
| 5,209,541 A * | 5/1993 | Janotik | B62D 23/005 280/785 |

(Continued)

FOREIGN PATENT DOCUMENTS

| | | |
|---|---|---|
| CA | 2 355 944 A1 | 2/2003 |
| CN | 86 102 863 A | 11/1986 |

(Continued)

*Primary Examiner* — Amber R Anderson
*Assistant Examiner* — Zachary A Hall
(74) *Attorney, Agent, or Firm* — Hackler Daghighian Martino & Novak (57) ABSTRACT

A double connector for butt-connecting two components includes a guide bolt having a respective bolt section tapering in the direction of each bolt end on both sides of a middle bolt section. Two spreading sockets are movably guided on the guide bolt and which in each case can be pushed together from an outer socket end position toward the middle bolt section into a mounted position. The two spreading sockets are latched against being pushed back, wherein the spreading sockets each have at least one spreading tab which is expanded outwardly via the guide bolt in the mounted position.

18 Claims, 4 Drawing Sheets

(56) References Cited

U.S. PATENT DOCUMENTS

| | | | | |
|---|---|---|---|---|
| 5,586,364 | A | * 12/1996 | Ferrari | F16B 21/02 411/46 |
| 5,810,505 | A | * 9/1998 | Henriott | F16B 12/14 108/153.1 |
| 5,860,253 | A | * 1/1999 | Lapointe | E01F 9/635 52/98 |
| 6,675,545 | B2 | * 1/2004 | Chen | B29C 65/564 52/586.1 |
| 9,926,960 | B2 | * 3/2018 | Stuut | F16B 21/186 |
| 10,202,993 | B2 | * 2/2019 | Koelling | A43C 15/161 |
| 2008/0315467 | A1 | * 12/2008 | von Wilcke | F16B 19/1045 264/573 |
| 2013/0270405 | A1 | * 10/2013 | Hunter | F16B 9/054 248/125.8 |

FOREIGN PATENT DOCUMENTS

| | | | | |
|---|---|---|---|---|
| DE | 2947750 | A1 | 7/1981 | |
| DE | 32 374 65 | A1 | 4/1984 | |
| DE | 3245948 | A1 * | 6/1984 | F16B 12/24 |
| DE | 10 2004 043 216 | A1 | 3/2006 | |
| DE | 10 2010 051372 | A1 | 5/2012 | |
| DE | 102013208494 | A1 * | 11/2013 | F16B 13/02 |
| FR | 2 082 716 | A5 | 12/1971 | |
| FR | 2570137 | A1 | 3/1986 | |
| GB | 1280536 | A | 7/1972 | |
| JP | S52-55436 | U | 4/1977 | |
| JP | S53-137956 | U | 10/1978 | |
| JP | H034910 | U | 1/1991 | |
| RU | 2010 122 682 | A | 12/2011 | |
| WO | 2015015603 | A1 | 2/2015 | |

\* cited by examiner

Fig. 4

DOUBLE CONNECTOR FOR BUTT-CONNECTING TWO COMPONENTS

CROSS-REFERENCE TO RELATED APPLICATIONS

This continuation application claims priority to PCT/EP2017/052088 filed on Feb. 1, 2017 which has published as WO 2017/186363 A1 and also the German application number 20 2016 102 175.8 filed on Apr. 25, 2016, the entire contents of which are fully incorporated herein with these references.

DESCRIPTION

Field of the Invention

The invention relates to a double connector for butt-connecting two components and an arrangement having such a double connector.

Background of the Invention

For butt-connecting two furniture parts, for example, eccentric connection fittings are known, in which a bolt is screwed into the one furniture part and a rotatable eccentric is inserted into a bore of the other furniture part. By means of a tool, the eccentric is rotated and as a result the bolt is tightened until both furniture parts bear against one another.

SUMMARY OF THE INVENTION

It is accordingly the object of the present invention to specify a connector by which two components, such as for example two furniture plates, can be fastened together without the use of tools and in an invisible manner. Additionally, the connector is always intended to be located in the middle of the plates irrespective of the plate thickness.

This object is achieved according to the invention by a double connector for butt-connecting two components, comprising a guide bolt having a respective bolt section tapering in the direction of each bolt end on both sides of a middle bolt section, and comprising two spreading sockets which are movably guided on the guide bolt and which in each case can be pushed together from an outer socket end position toward the middle bolt section into a mounted position, in which the two spreading sockets are latched against being pushed back and are able to bear against one another, wherein the spreading sockets each have at least one spreading tab which is spreaded outwardly via the guide bolt in the mounted position.

According to the invention, the two spreading sockets in each case are inserted in the bores of the components and the pushed-together spreading tabs are spreaded by the guide bolt in each case outwardly. In the mounted position the spreading sockets, on the one hand, are fixedly anchored in the bore walls of the components by the spreading tabs, which have been spreaded, and, on the other hand, are secured against being pushed back. The double connector according to the invention may be used universally for connecting any two components, even different components, for example in the furniture industry for connecting two furniture parts, or in automotive or medical technology.

Preferably, the two bolt ends in each case are configured as a bolt head which in the mounted position engages in a latching manner behind the respective spreading socket in the pushed-together direction thereof. Alternatively, the two spreading sockets in the mounted position may also be latched directly together and, as a result, secured against being pushed back.

Particularly preferably, the spreading sockets in each case comprises a sleeve section which in the outer socket end position has an unround, in particular oval or elliptical, outer periphery which, by pressing together the sleeve section along the long axis of the unround outer periphery, in particular along the main axis of the oval or elliptical outer periphery, is deformable to a more round outer periphery, in particular a round or almost round outer periphery. In at least one of those peripheral segments which, when the sleeve section is undeformed, do not protrude outwardly over the outer periphery of the deformed sleeve section, the sleeve section comprises a latching recess on the inner face, wherein in the outer socket end position the latching recess, when the sleeve section is undeformed, is latched to the bolt end and, when the sleeve section is deformed, is no longer or only slightly latched to the bolt end. If the unround outer periphery of the spreading socket has been deformed forcibly by the bore to the more round outer periphery, in particular to the round or almost round outer periphery, the guide bolt is either already completely released (unlatched) or a slight latching which is still present may be easily overcome by a small impact. An inadvertent compression is thus prevented (security for transport and/or security against faulty operation).

Advantageously, the middle bolt section comprises a stop defining the mounted position, the two spreading sockets in the mounted position being able to bear thereagainst.

Preferably, the at least one spreading tab on its outer face in each case comprises a transversely extending outer rib for inserting in the bore wall.

In the case of an spreading socket with a plurality of spreading tabs, particularly preferably the rear front faces of at least some of the spreading tabs, in particular all of the spreading tabs of the spreading socket, in each case are axially offset to one another in order to be latched to the bolt head in different axial positions and thus compensate for an insertion to a variable depth of the spreading sockets or the depth stop in the plate material. According to what extent the spreading sockets or the depth stops are inserted into the components, in the mounted position a gap of up to 2 mm may be present between the spreading sockets.

The insertion of the spreading socket into a bore of the component can be limited via a depth stop in the form of an edge flange on the front end of the spreading socket.

The double connector can either be assembled from individual parts or can be configured as an integral plastics injection-molded part with a guide bolt made from plastics or as an integral plastics injection-molded part with the guide bolt as an insert.

Preferably, the spreading sockets are filled with glue which is then forced out when the spreading sockets are pushed together.

The invention finally also relates to an arrangement comprising two components which bear against one another and comprising a double connector which is configured as above and which is inserted with its spreading sockets in bores of the components, wherein the spreading sockets are pushed together on the guide bolt and in this mounted position are latched and wherein the spreading tabs are spreaded by the guide bolt in each case outwardly. The two spreading sockets are either latched onto the guide bolt or directly latched together. Preferably, the spreading sockets in the mounted position are pushed together until they mutually bear against one another.

Further advantages of the invention are revealed from the description, the claims and the drawings. The features cited above and set forth below may also be used individually or in arbitrary combinations. The embodiment shown and described is not to be understood as exhaustive enumeration but has only exemplary character for describing the invention.

BRIEF DESCRIPTION OF THE DRAWINGS

In the drawings:

FIGS. 1a, 1b show the double connector according to the invention with two spreading sockets in their respective outer socket end positions on a guide bolt in a first side view (FIG. 1a), and in a cross-sectional view (FIG. 1b) according to Ib-Ib in FIG. 1a;

FIGS. 2a, 2b show the double connector shown in FIG. 1 in a second side view (FIG. 2a) rotated by 90° relative to FIG. 1, and in a cross-sectional view (FIG. 2b) according to IIb-IIb in FIG. 2a;

FIGS. 3a, 3b show the double connector with its two spreading sockets inserted in each case in a bore, in a side view (FIG. 3a) corresponding to FIG. 2a, and in a cross-sectional view (FIG. 3b) according to IIIb-IIIb in FIG. 3a.

DETAILED DESCRIPTION OF THE PREFERRED EMBODIMENTS

The double connector 1 shown in FIGS. 1 to 4 serves for butt-connecting two furniture parts 2 which bear against one another in a planar manner and which in each case have a receiving bore 3.

The double connector 1 comprises a guide bolt 4 which on either side of a middle bolt section 5 in each case has a bolt section 7 tapering in the direction of the respective bolt end 6, and two spreading sockets 8 which are displaceably guided on the guide bolt 4 and which in each case are able to be pushed together from an outer socket end position (FIGS. 1a, 2a) toward the middle bolt section 5 into a mounted position (FIG. 4) in which the two spreading sockets 8 are able to bear against one another and are latched against being pushed back. The spreading sockets 8 in each case comprise a plurality of spreading tabs 10 (here by way of example four) which are rotationally symmetrically arranged around the longitudinal socket axis 9 and which in the mounted position are spreaded outwardly by the guide bolt 4. The two bolt ends 6 in each case are configured as bolt heads.

The guide bolt 4 in the exemplary embodiment shown is mirror-symmetrical to its middle plane but may alternatively also be asymmetrical, for example configured with two differently tapered bolt sections 7. The two spreading sockets 8 in the exemplary embodiment shown are of the same construction but alternatively may also be of different configuration.

The spreading sockets 8 in each case comprise a sleeve section 11 which terminates with an edge flange 12 on its front sleeve end facing the respective other spreading socket. From the other rear sleeve end, the spreading tabs 10 extend with their free tab ends to the rear, wherein the rear front faces 13 of the four spreading tabs 11 do not terminate at the same axial height but in each case are offset to one another by 0.25 mm. On their outer faces the spreading tabs 10 in each case have a further transversely extending claw-shaped outer rib 14.

Figure 1A:
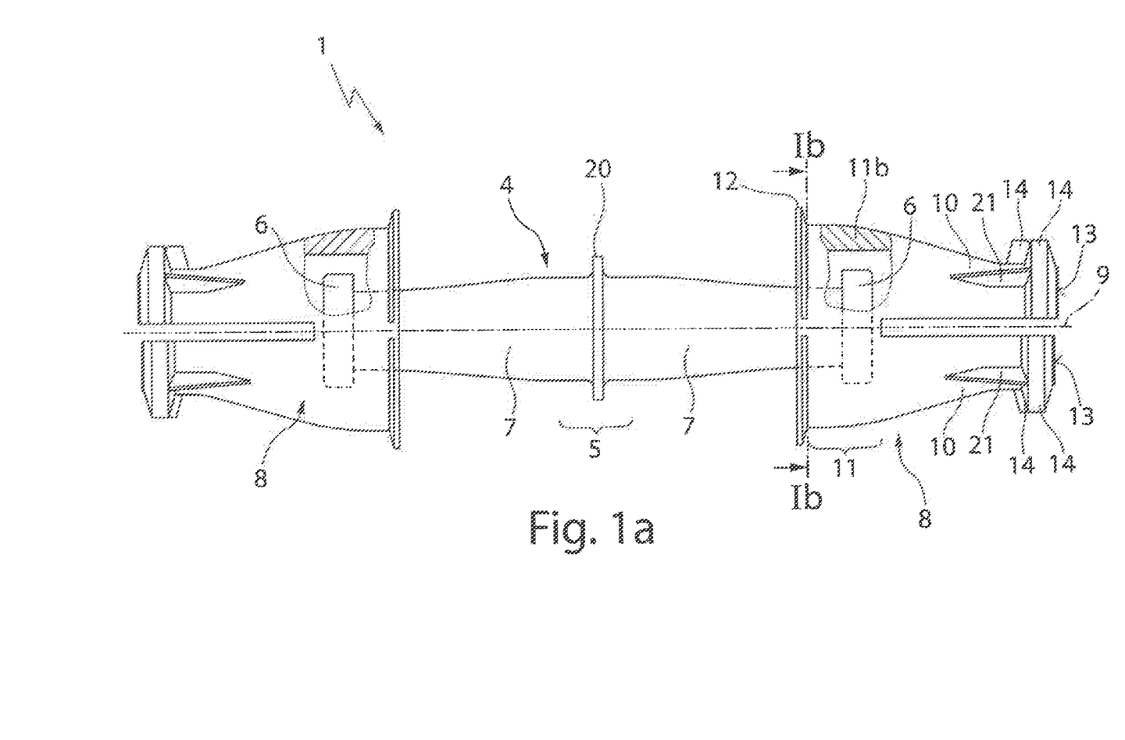
Figure 1B:
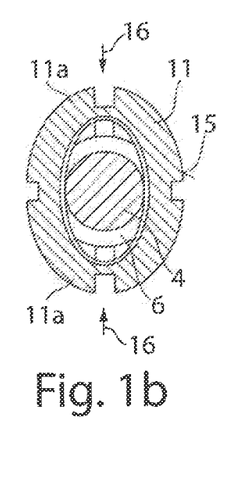
Figure 2A:
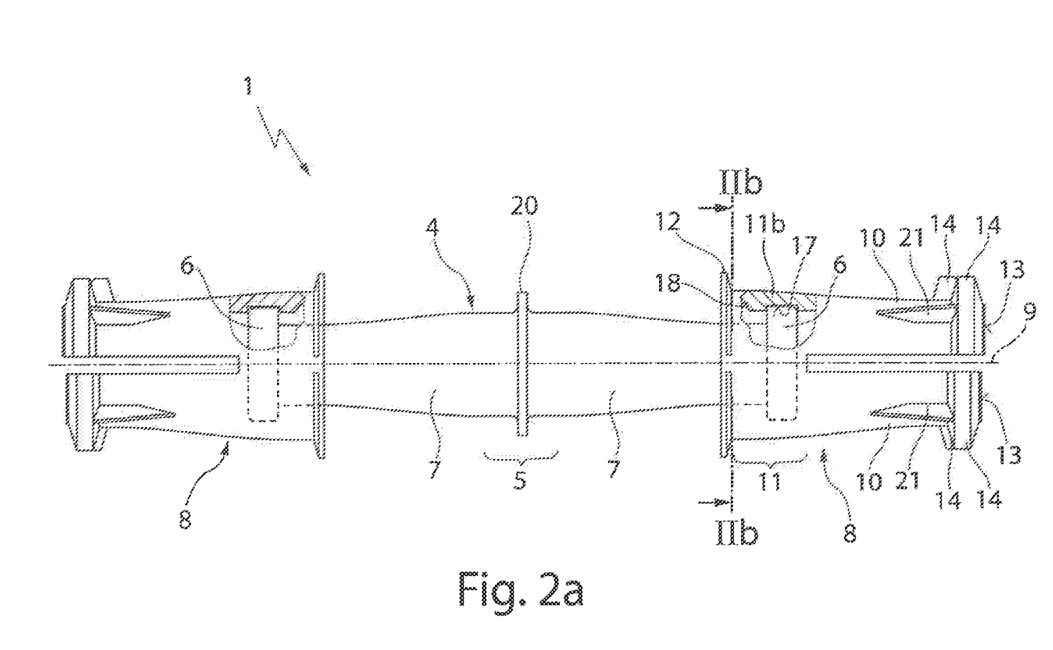
Figure 2B:
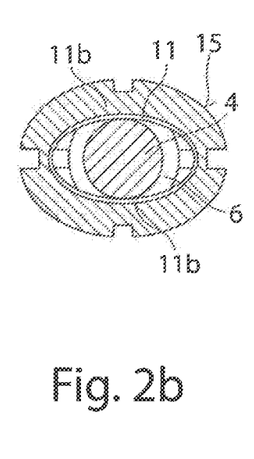
Figure 3A:
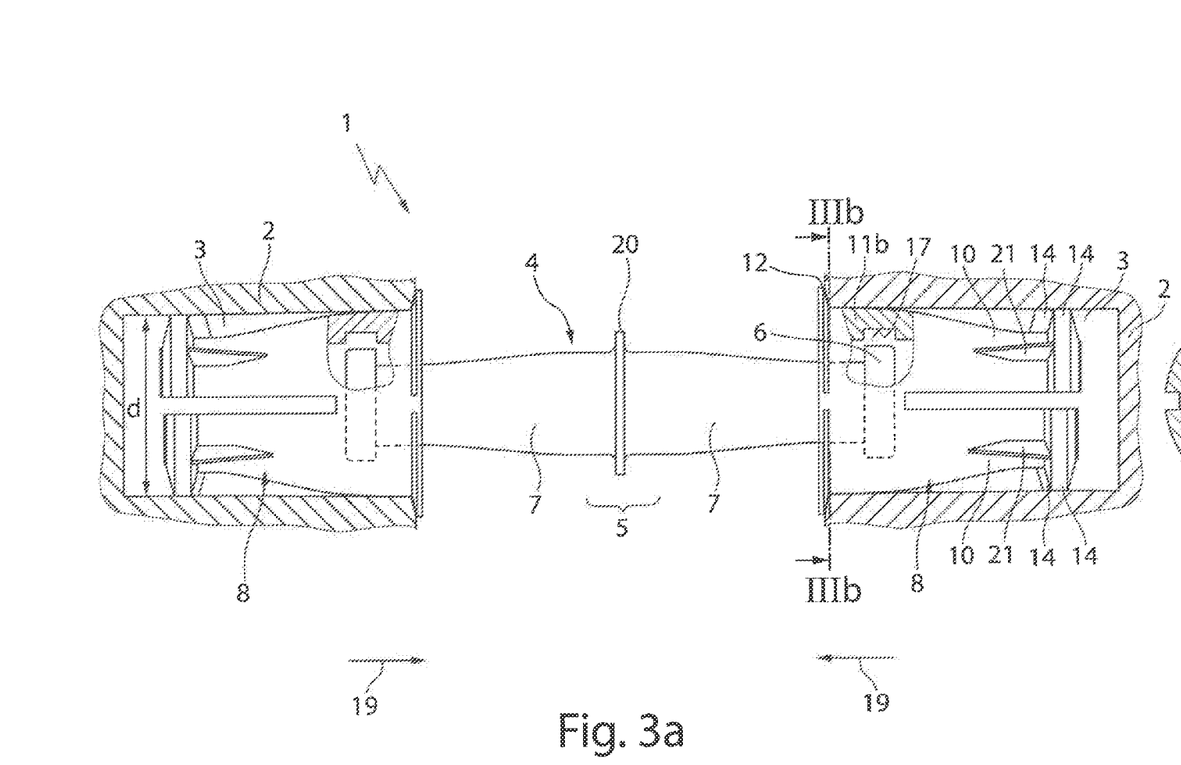
Figure 3B:
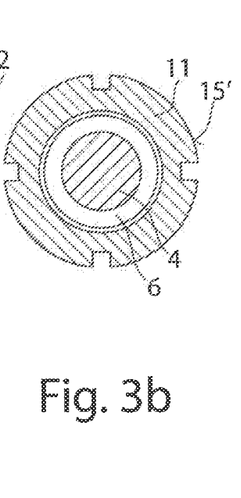

In the outer socket end position the sleeve section 11 has an oval or elliptical outer periphery 15 (FIGS. 1b, 2b) which by compressing the sleeve section 11 along the main axis of the elliptical outer periphery, i.e. in the direction of the arrows 16, can be deformed to an approximately round outer periphery 15' (FIG. 3b). The internal diameter of the sleeve section 11 which is deformed to the round outer periphery 15' in this case corresponds to the diameter of the middle bolt section 5.

In the two opposing sleeve segments 11a in which the elliptical outer periphery 15 of the undeformed sleeve section 11 protrudes radially outwardly over the subsequently approximately round outer periphery 15' of the deformed sleeve section 11, i.e. in the sleeve segments around the two main apexes of the elliptical outer periphery 15, the sleeve section 11 tapers continuously or steplessly to the rear. In the exemplary embodiment shown, the undeformed sleeve section 11 tapers on its entire outer periphery continuously or steplessly to the rear.

In the two opposing sleeve segments 11b in which the elliptical outer periphery 15 of the undeformed sleeve section 11 does not protrude radially outwardly over the subsequently approximately round outer periphery 15' of the deformed sleeve section 11, i.e. in the sleeve segments around the two secondary apexes of the elliptical outer periphery 15, the sleeve section 11 on the inner face in each case comprises a latching recess 17 which is configured as an internal groove with a lead-in chamfer 18 arranged upstream thereof.

The double connector 1 is assembled as follows from its individual parts. The two spreading sockets 8 are pushed with their edge flanges 12 at the front onto the respective bolt head 6 of the guide bolt 6. In this case, the internal diameter of the sleeve section 11 is expanded resiliently by the two lead-in chamfers 18 to the diameter of the bolt head 6, until the sleeve section 11 is latched with its two latching recesses 17 on the bolt head 6 (FIG. 2a) and the spreading socket 8 is thus fixed in position on the guide bolt 4. By this positional fixing, the double connector 1 is secured against inadvertent compression of the two spreading sockets 8 (transport security). The resilient spring action of the sleeve sections 11, therefore, is utilized for latching onto the bolt ends 6.

Alternatively, the double connector may also be produced as an integral plastics injection-molded part and namely either with a guide bolt 4 made of plastics or with the guide bolt 4 (for example made of zinc or steel) as an insert.

The double connector 1 is inserted with its engaged spreading sockets 8 at the front in each case into the round bores 3 of the furniture parts 2 until the spreading sockets 8 bear with their edge flanges 12 against the furniture parts 2. Since the bore diameter d is smaller than the main axis of the elliptical outer periphery 15 of the undeformed sleeve section 11, when the sleeve section 11 enters the bore 3 the protruding peripheral segments 11a due to their tapering in the direction of the arrows 16 are compressed to the bore diameter d. As a result, at the same time the two other peripheral segments 11b are forced apart sufficiently far that their latching recesses 17 on the inner face are no longer or only slightly latched onto the bolt head 6 (FIG. 3a). Since the original elliptical outer periphery 15 of the sleeve section 11 is now deformed to the approximately round outer periphery 15' corresponding to the bore diameter d, the blocking of the spreading sockets 8 on the guide bolt 4 is released and the two spreading sockets 8 may be pushed together further. In other words, the guide bolt 4 is released only when the elliptical outer periphery 15 of the sleeve section 11 has been forced through the bore 3 into the round outer periphery 15' and can spread the spreading tabs 10 (security against faulty operation). A slight latching which is still present after the forced deformation can be easily overcome by a small impact.

Subsequently, the two furniture parts 2 are pushed together until they mutually bear against one another, whereby the guide bolt 4 with its bolt heads 6 is pushed further into the spreading sockets 8. The two spreading sockets 8 are in this case each pushed together further in the direction 19 onto the middle bolt section 5 as far as their mounted position (FIG. 4) in which they are able to bear both against one another and in the middle of the bolt against a radially outwardly protruding stop (stop ring) 20 of the guide bolt 4. The stop 20 prevents pushing too far on one side onto the spreading sockets 8. When the spreading sockets 8 are pushed together, the spreading tabs 10 continue to be spreaded further outwardly on the tapered bolt section 7, whereby the transverse ribs 14 are forced into the wall of the bore 3. Each spreading tab 10 on its outer face has an axially extending reinforcing rib 21 thereby preventing the spreading tabs 10 when spreaded from breaking.

Figure 4:
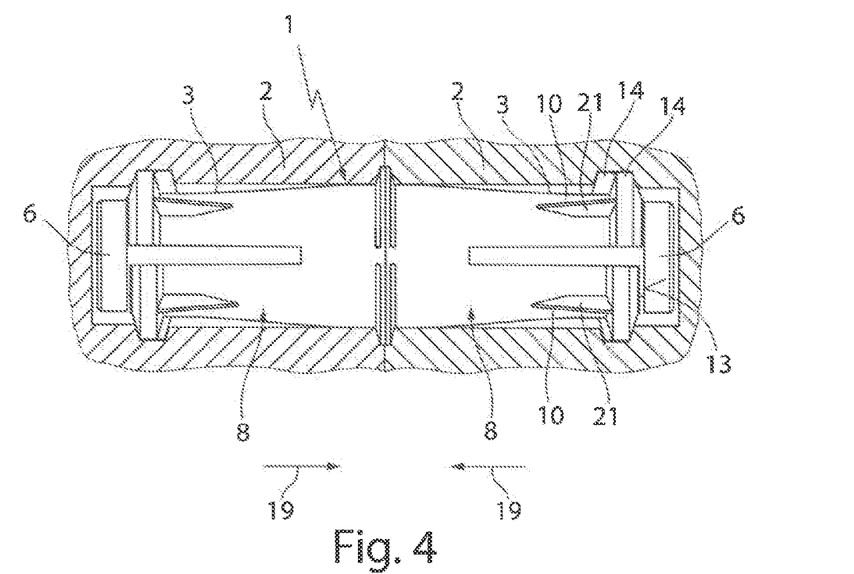
FIG. 4 shows the double connector with its two spreading sockets pushed together until they mutually bear against the guide bolt, in a side view.

In the mounted position of FIG. 4, at least one of the four spreading tabs 10 is pushed with its rear front face 13 past the bolt head 6 and is engaged from behind by the bolt head 6 in the respective pushing direction 19, whereby the spreading socket 8 is secured against being pushed back. In the mounted position the edge flanges 12 are pushed fully into the furniture parts 2 so that the two furniture parts 2 bear against one another without gaps. The two spreading sockets 8, on the one hand, are fixedly anchored in the bore walls of the furniture 2 by the transverse ribs 14 of their spreaded tabs 10, and, on the other hand, secured against one another by the latching thereof on the guide bolt 4, so that the two furniture parts 2 are fastened together. The entire assembly of the connection of the two furniture parts 2 thus takes place entirely without the use of tools, by means of the double connector 1.

The rear front faces 13 of the spreading tabs 10 are, therefore, axially offset to one another in order to compensate for a variable depth of insertion of the edge flanges 12 in the plate material. With a 90° abutment of two furniture parts 2 configured as furniture plates, the one bore is located in the plate surface of the one furniture plate and the other bore is located in the front face of the second furniture plate. The double connector 1 is forced into the bore on the front face, since here the soft middle layer of the chip board which is able to offer only low resistance is present. Since it is not known how deep the double connector 1 is forced in, compensation has to be provided therefor, said compensation taking place via the four different axial positions of the rear front faces 13. If all rear front faces 13 were to terminate at the same axial height, two cases of mutual latching would be produced: either the connection wobbles since too much clearance is present between the rear front faces 13 and the bolt head 6 or the latching position cannot even be achieved if the double connector 1 is embedded too deeply into the soft front edge and thus the rear front faces 13 do not engage behind the bolt head 6. According to what extent the spreading sockets 8 or the edge flanges 12 are forced into the furniture parts 2, in the mounted position a gap of up to 2 mm can be present between the spreading sockets 8.

Since the spreading socket 8 has to be "overexpanded" so that it may be latched to the bolt head 6, the inner faces of the spreading tabs 10 cooperating with the guide bolt 4 are not designed identically or rotationally symmetrically to one another so that the spreading force is distributed in the best possible manner.

Instead of latching to the guide bolt 4, as in the exemplary embodiment shown, alternatively the spreading sockets 8 in the mounted position may also be latched directly together, for example by means of latching hooks which engage behind the respective other spreading socket 8 in the mounted position in a latching manner and thereby secure the spreading sockets 8 against being pushed apart.

Optionally, glue (for example PVA glue) may also be added to the pure latching and claw connection in order to provide even more stability to the connection which is designed in any case not to be dismantable. In this case, the glue is not provided in the bore but, before final mounting, directly into corresponding cavities of the spreading sockets 8. A defined position and metering of the glue is advantageous where this is required. When pushed together (final mounting) the glue is then forced out. Additional gluing potentially becomes all the more important as the quality of the plate is continually reducing (for cost reasons). In order to ensure the retention of the glue on the double connector 1 without dripping, a special low-viscous glue may be used. As a result, the double connector 1 can be used universally with or without the addition of glue, depending on the application.

The double connector 1 may not only be used for connecting two furniture parts 2, as in the exemplary embodiment shown, but universally for connecting any two components, even different components. In principle, applications in automobile or medical technology or other industries are also possible.

What is claimed is:

1. A double connector for butt-connecting two components, comprising:
    a guide bolt having two bolt ends each configured as a bolt head, a middle bolt section and a respective bolt section located between the bolt head and the middle bolt section and tapering in the direction of each bolt head on both sides of the middle bolt section; and
    two spreading sockets which are movably guided on the guide bolt and which in each case can be pushed together from an outer socket end position toward the middle bolt section into a mounted position;
    wherein in the mounted position, the two spreading sockets are latched against being pushed back;
    wherein the spreading sockets each have at least one spreading tab which is spread outwardly via the tapered bolt section in the mounted position;
    wherein the spreading sockets in each case comprise a sleeve section which in the outer socket end position comprise an unround, oval or eliptical, outer periphery which by pressing together the sleeve section along a long axis of the unround outer periphery, along a main axis of the oval or elliptical outer periphery, is deformable to a round, a more round or almost round outer periphery;
    wherein in at least one of those sleeve segments which, when the sleeve section is undeformed, do not protrude outwardly over the outer periphery of the deformed sleeve section, the sleeve section comprises a latching recess on the inner face; and
    wherein in the outer socket end position the latching recess, when the sleeve section is undeformed, is latched to the bolt head and, when the sleeve section is deformed, is no longer or only slightly latched to the bolt head.

2. The double connector as claimed in claim 1, wherein the two spreading sockets bear against one another in the mounted position.

3. The double connector as claimed in claim 1, wherein two in the mounted position the bolt heads engage in a latching manner behind the respective spreading socket in a pushed-together direction thereof.

4. The double connector as claimed in claim 1, wherein an internal diameter of the sleeve section deformed to the round or almost round outer periphery corresponds to the diameter of the middle bolt section.

5. The double connector as claimed in claim 4, wherein the sleeve section tapers to a rear, at least in those sleeve segments which protrude outwardly when the sleeve section is not deformed over the outer periphery of the deformed sleeve section.

6. The double connector as claimed in claim 1, wherein the middle bolt section comprises a stop, the two spreading sockets in the mounted position being able to bear thereagainst.

7. The double connector as claimed in claim 1, wherein the two spreading sockets are of the same construction.

8. The double connector as claimed in claim 1, wherein the guide bolt is mirror-symmetrical to its middle plane.

9. The double connector as claimed in claim 1, wherein in the mounted position the at least one spreading tab is pushed with its rear front face past the bolt head and is engaged from behind by the bolt head in the respective pushing direction.

10. The double connector as claimed in claim 1, wherein the at least one spreading tab on its outer faces comprises a transversely extending outer rib.

11. The double connector as claimed in claim 1, wherein the spreading sockets in each case comprise a plurality of spreading tabs, arranged rotationally symmetrically around the longitudinal socket axis.

12. The double connector as claimed in claim 11, wherein rear front faces of at least some of the spreading tabs of the spreading socket in each case are axially offset to one another.

13. The double connector as claimed in claim 1, wherein the spreading sockets at their front end in each case comprise an edge flange which limits the insertion of the spreading socket into a bore of the component.

14. The double connector as claimed in claim 1, wherein the spreading sockets are stuck onto the guide bolt.

15. The double connector as claimed in claim 1, wherein the double connector is formed as an integral plastics injection-molded part with the guide bolt made of plastics or as an integral injection-molded part with the guide bolt as an insert.

16. The double connector as claimed in claim 1, wherein the spreading sockets are filled with glue.

17. An arrangement comprising two components which bear against one another and comprising a double connector, as claimed in claim 1, which is inserted with its spreading sockets in bores of the components, wherein the spreading sockets are pushed together on the guide bolt and in this mounted position are latched and wherein the spreading tabs are spread by the guide bolt in each case outwardly.

18. The arrangement as claimed in claim 17, wherein the spreading sockets in the mounted position are pushed together until they mutually bear against one another.

\* \* \* \* \*

UNITED STATES PATENT AND TRADEMARK OFFICE
CERTIFICATE OF CORRECTION

| | |
|---|---|
| PATENT NO. | : 11,401,961 B2 |
| APPLICATION NO. | : 16/138976 |
| DATED | : August 2, 2022 |
| INVENTOR(S) | : Gunter Nitschmann |

It is certified that error appears in the above-identified patent and that said Letters Patent is hereby corrected as shown below:

In the Claims

Column 6, Claim 1, Line 55, "eliptical" should read --elliptical--.

Column 7, Claim 3, Line 8, delete "two".

Signed and Sealed this
Eighth Day of November, 2022

Katherine Kelly Vidal
*Director of the United States Patent and Trademark Office*